(12) United States Patent
Takushima et al.

(10) Patent No.: US 6,810,170 B2
(45) Date of Patent: Oct. 26, 2004

(54) OPTICAL SIGNAL PROCESSOR

(75) Inventors: Michiko Takushima, Yokohama (JP); Tomomi Sano, Yokohama (JP); Hiroshi Suganuma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/458,374

(22) Filed: Jun. 11, 2003

(65) Prior Publication Data

US 2003/0228108 A1 Dec. 11, 2003

(30) Foreign Application Priority Data

Jun. 11, 2002 (JP) ..................................... P2002-170481

(51) Int. Cl.⁷ ................................................. G02B 6/28
(52) U.S. Cl. ......................................... 385/24; 385/47
(58) Field of Search ........................................... 385/24

(56) References Cited

U.S. PATENT DOCUMENTS

| | | | |
|---|---|---|---|
| 5,311,606 A | 5/1994 | Asakura et al. | |
| 5,583,683 A | * 12/1996 | Scobey | 398/79 |
| 5,805,759 A | 9/1998 | Fukushima | |
| 5,859,717 A | * 1/1999 | Scobey et al. | 398/79 |
| 2003/0113067 A1 | * 6/2003 | Koh et al. | 385/48 |

* cited by examiner

Primary Examiner—John R. Lee
Assistant Examiner—Phillip A Johnston
(74) Attorney, Agent, or Firm—McDermott Will & Emery LLP

(57) ABSTRACT

Light output from the distal end of an optical fiber collimator is input to a first diffraction grating formed on a first surface of a transparent member, and diffracted by the first diffraction grating at angles corresponding to wavelengths, and thus wavelength-branched. The light components of the respective wavelengths branched by the first diffraction grating and having propagated through the transparent member, are diffracted by a second diffraction grating formed on a second surface of the transparent member, and output from the transparent member. Each of the light components of the respective wavelengths, which are diffracted by the second diffraction grating and output from the transparent member, is input to the distal end of a corresponding one of optical fiber collimators, focused, and propagates through the optical fiber.

21 Claims, 11 Drawing Sheets

OPTICAL SIGNAL PROCESSOR

BACKGROUND OF THE INVENTION

1. Field of the Invention

The present invention relates to an optical signal processor capable of multiplexing/demultiplexing multi-wavelength light.

2. Related Background Art

An optical signal processor disclosed in the specification of U.S. Pat. No. 5,311,606 is known as an optical signal processor capable of multiplexing/demultiplexing multi-wavelength light. The optical signal processor disclosed in this specification includes first and second diffraction grating elements. A diffraction grating element is used as a spatial wavelength branch means which receives light that has propagated through a space and diffracts the light at angles corresponding to wavelengths, thereby spatially branching the light components of the respective wavelengths. When the optical signal processor is used as an optical demultiplexer, wavelength-multiplexed light is diffracted by the first diffraction grating element to branch the wavelengths. The branched light components of the respective wavelengths are diffracted by the second diffraction grating element again and output in parallel. When the optical signal processor is used as an optical multiplexer, light components of the respective wavelengths are diffracted by the second diffraction grating element first. Then, the diffracted light components are diffracted by the first diffraction grating element again and multiplexed.

SUMMARY OF THE INVENTION

In the optical signal processor, if the relative position between the plurality of diffraction grating elements is deviated from the design value, no desired optical characteristics can be obtained. To prevent this, it is essential to accurately position each of the plurality of diffraction grating elements at the time of assembly. However, in the conventional optical signal processor, the elements are hard to accurately position, resulting in high manufacturing cost.

The present invention has been made to solve the above problem, and the objective of the present invention is to provide an optical signal processor having desired optical characteristics.

An optical signal processor of the present invention is characterized by comprising a transparent member, which has a first surface and a second surface parallel to the first surface, first spatial wavelength branch means, which branches a light input thereto into light components of different wavelengths and is formed on the first surface, and second spatial wavelength branch means, which outputs the branched light components in parallel to each other and is formed on the second surface.

According to this optical signal processor, the input light is wavelength-branched by the first spatial wavelength branch means formed on the first surface of the transparent member. The branched light components of the respective wavelengths are output in parallel by the second spatial wavelength branch means formed on the second surface parallel to the first surface. This optical signal processor can operate as an optical demultiplexer, an optical multiplexer, or a dispersion adjusting device. Since the first and second spatial wavelength branch means are formed on the surfaces of one transparent member, the two means can easily be accurately positioned. For this reason, an optical signal processor having desired optical characteristics can easily be achieved.

In the optical signal processor of the present invention, the transparent member is preferably made of silica glass. In this case, the optical loss in the transparent member is small. Also, the transparent member is preferably made of a plastic. In this case, replicas can be formed using a mold, and transparent members can be mass-produced at a low cost.

In the optical signal processor of the present invention, preferably, the optical path returning means is arranged for each of optical paths of the light components of the respective wavelengths, which are output from the second spatial wavelength branch means, and a distance between a diffraction position of a light component having a specific wavelength on the second spatial wavelength branch means and the optical path returning means corresponding to this light component is different from a distance between a diffraction position of a light component having another wavelength on the second spatial wavelength branch means and the optical path returning means corresponding to this light component.

In this case, since the optical path length of a light component having a specific wavelength in the optical signal processor is different from that of a light component having another wavelength, chromatic dispersion in these light components can be adjusted.

Also, in the optical signal processor of the present invention, preferably, the optical path returning means is arranged for each of optical paths of the light components of the respective wavelengths, which are output from the second spatial wavelength branch means, and a position at which the optical path returning means corresponding to each wavelength is arranged can be changed in a direction of optical path. In this case, the chromatic dispersion adjusting amount can be changed.

DESCRIPTION OF THE PREFERRED EMBODIMENTS

Figure 1:
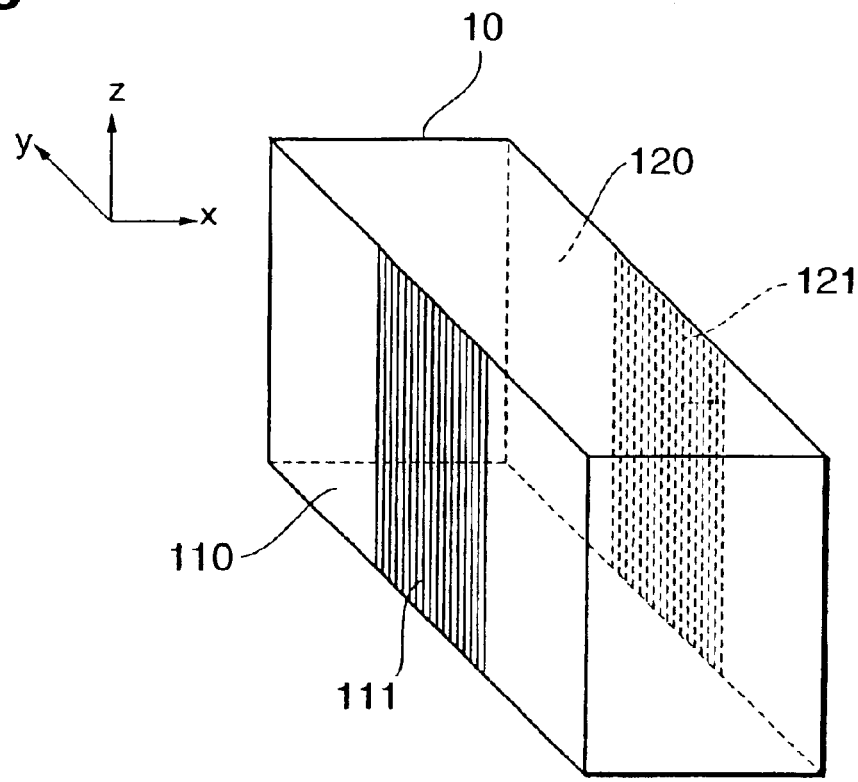
FIG. 1 is a perspective view of a transparent member 10 included in an optical signal processor 1 according to the first embodiment.

The embodiments of the present invention will be described below in detail with reference to the accompanying drawings. The same reference numerals denote the same elements throughout the drawings, and a repetitive description thereof will be omitted.

(First Embodiment)

Figure 2:
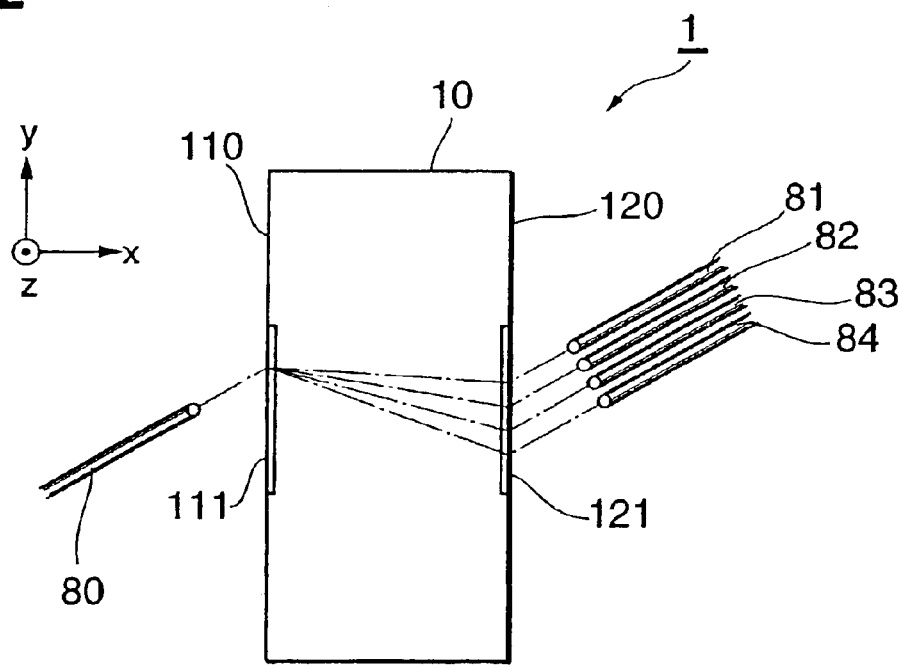
FIG. 2 is a plan view of optical signal processor 1 according to the first embodiment.

An optical signal processor according to the first embodiment of the present invention will be described first. FIG. 1 is a perspective view of a transparent member 10 included in an optical signal processor 1 according to the first embodiment. FIG. 2 is a plan view of optical signal processor 1 according to the first embodiment. FIGS. 1 and 2 also show an x-y-z Cartesian coordinate system for the descriptive convenience. FIG. 2 shows the optical signal processor viewed from the direction of z-axis. The optical paths of the light components of the respective wavelengths are indicated by alternate long and short dashed lines. Optical signal processor 1 according to the first embodiment comprises transparent member 10 and optical fiber collimators 80 to 84.

Transparent member 10 is made of a material that is transparent in the use wavelength band. For example, transparent member 10 is made of silica glass or a plastic generally used for an optical lens and the like. Transparent member 10 has a first surface 110 and a second surface 120, which are parallel to each other. A transparent first diffraction grating 111 serving as a first spatial wavelength branch means is formed on first surface 110 of transparent member 10. A transparent second diffraction grating 121 serving as a second spatial wavelength branch means is formed on second surface 120 of transparent member 10. First surface 110 and second surface 120 are parallel to the y-z plane. First diffraction grating 111 and second diffraction grating 121 have grating directions parallel to the z-axis, identical grating periods, and identical structures.

Each of optical fiber collimators 80 to 84 is formed from an optical fiber with a distal end processed into a spherical shape or an optical fiber having a lens connected to its distal end. Each of optical fiber collimators 80 to 84 has a collimator function. Each of optical fiber collimators 80 to 84 can collimate and output light which has propagated through the optical fiber and reached the distal end, and focus external light, which has reached the distal end, and propagate the light through the optical fiber. Optical fiber collimators 80 to 84 are arranged such that their optical axes become parallel to the x-y plane and parallel to each other.

Optical signal processor 1 operates as an optical demultiplexer in the following way. Light that is collimated and output from the distal end of optical fiber collimator 80 is input to first diffraction grating 111 formed on first surface 110 of transparent member 10. The light is diffracted by first diffraction grating 111 at diffraction angles corresponding to the wavelengths and thus wavelength-branched. The light components of the respective wavelengths branched by first diffraction grating 111 propagate through transparent member 10 toward second surface 120 of transparent member 10. Second diffraction grating 121 is formed in the region that includes the positions at which the branched light components of the respective wavelengths are input to second surface 120. The light components of the respective wavelengths input to second diffraction grating 121 are diffracted by second diffraction grating 121 and output from transparent member 10. First diffraction grating 111 and second diffraction grating 121 have identical structures. For this reason, the exit angle (angle made by the direction of light propagation and the normal to second surface 120) of each of the light components of the respective wavelengths, which are diffracted by second diffraction grating 121 and output from transparent member 10, equals the incident angle (angle made by the direction of light propagation and the normal to first surface 110) of light input to first diffraction grating 111. Each of the light components of the respective wavelengths which are diffracted by second diffraction grating 121 and output from transparent member 10 reaches the distal end of one of optical fiber collimators 81 to 84 and then is focused and propagates through the optical fiber.

In this way, optical signal processor 1 wavelength-branches the light collimated and output from the distal end of optical fiber collimator 80 through first diffraction grating 111 and second diffraction grating 121 of transparent member 10, and then, outputs the branched light components of the respective wavelengths from the transparent member 10 in parallel. Optical signal processor 1 causes light having a wavelength $\lambda_1$ to enter optical fiber collimator 81, causes light having a wavelength $\lambda_2$ to enter optical fiber collimator 82, causes light having a wavelength $\lambda_3$ to enter optical fiber collimator 83, and causes light having a wavelength $\lambda_4$ to enter optical fiber collimator 84. As described above, optical signal processor 1 can operate as an optical demultiplexer.

Optical signal processor 1 also multiplexes light having wavelength $\lambda_1$, which is collimated and output from the distal end of optical fiber collimator 81, light having wavelength $\lambda_2$ which is collimated and output from the distal end of optical fiber collimator 82, light having wavelength $\lambda_3$, which is collimated and output from the distal end of optical fiber collimator 83, and light having wavelength $\lambda_4$, which is collimated and output from the distal end of optical fiber collimator 84 through second diffraction grating 121 and first diffraction grating 111 of transparent member 10 and outputs the multiplexed light from transparent member 10. Then, optical signal processor 1 causes the light having wavelengths $\lambda_1$ to $\lambda_4$ to enter optical fiber collimator 80. As described above, optical signal processor 1 can also operate as an optical multiplexer.

Figure 3:
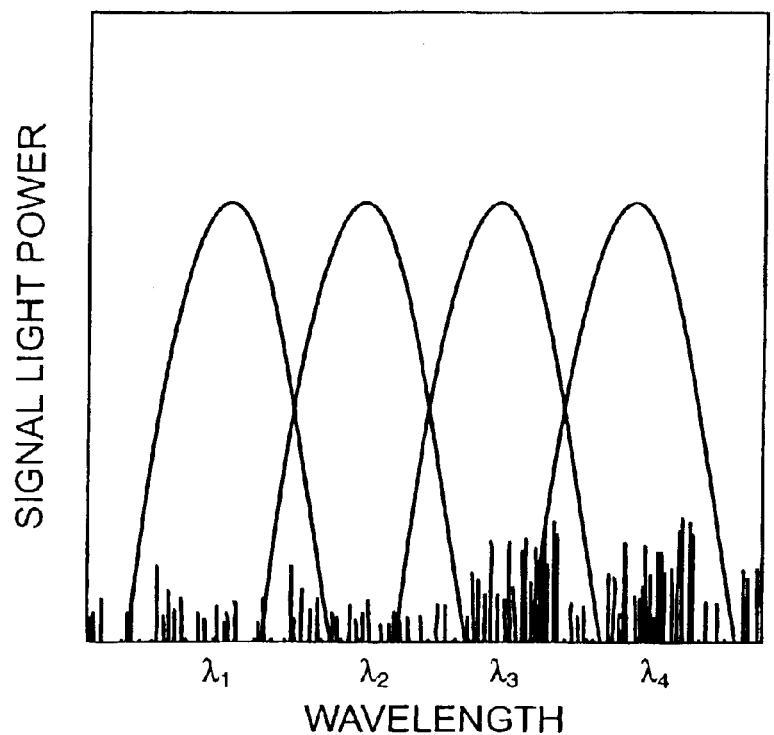
FIG. 3 is a graph showing the spectrum characteristics of optical signal processor 1 according to the first embodiment.

FIG. 3 is a graph showing the spectrum characteristics of optical signal processor 1 according to the first embodiment. In this case, transparent member 10 was made of silica glass. The interval between first surface 110 and second surface 120 of transparent member 10 was 30 mm. The grating spacing of first diffraction grating 111 and second diffraction grating 121 was 4 μm. Light which is output from the distal end of optical fiber collimator 80 and input to first diffraction grating 111 has a flat spectrum in a wide wavelength range. The incident angle was 10°. FIG. 3 shows the spectra of light components input to the distal ends of optical fiber collimators 81 to 84. As is apparent from FIG. 3, optical signal processor 1 can operate as an optical demultiplexer.

As described above, optical signal processor 1 according to the first embodiment can operate as an optical multiplexer or an optical demultiplexer. In addition, optical signal processor 1 includes transparent first diffraction grating 111 and second diffraction grating 121, which are formed on the surfaces of transparent member 10, as means for multiplexing or demultiplexing light. Such transparent member 10 can easily be formed by cutting or the like. When replicas are formed by using a mold, transparent members 10 can be mass-produced at a low cost. In addition, the relative position between first diffraction grating 111 and second diffraction grating 121 is fixed and can have the design value. Hence, optical signal processor 1 has desired optical characteristics and can easily be manufactured at a low cost.

(Second Embodiment)

Figure 4:
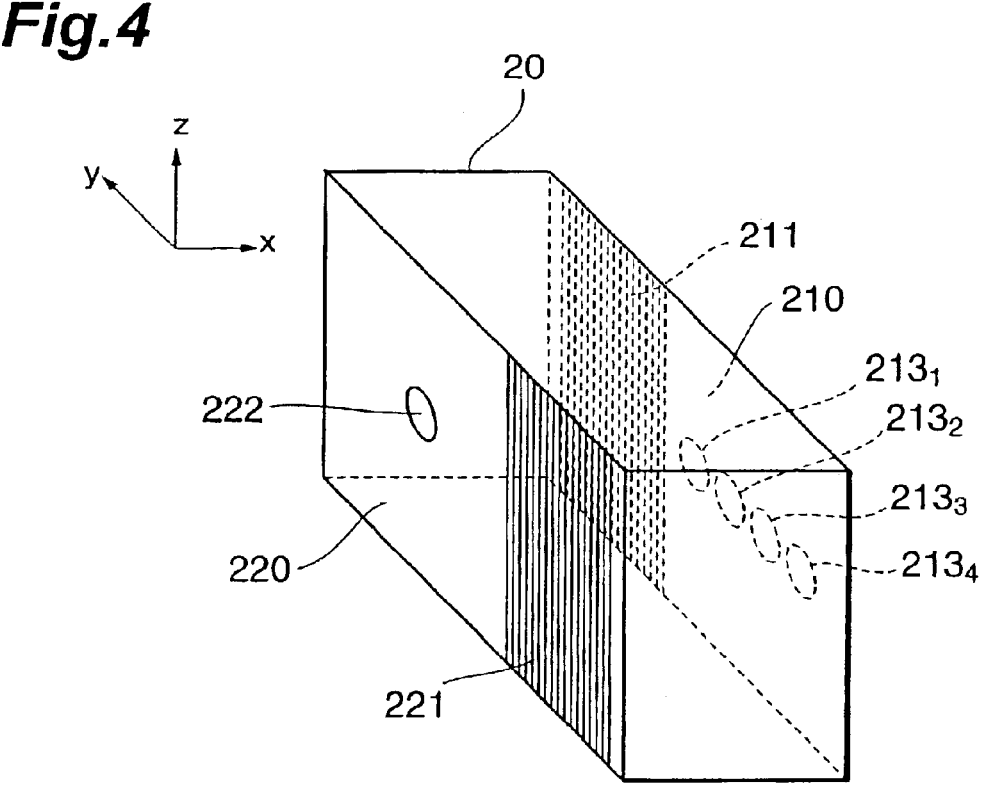
FIG. 4 is a perspective view of a transparent member 20 included in an optical signal processor 2 according to the second embodiment.
Figure 5:
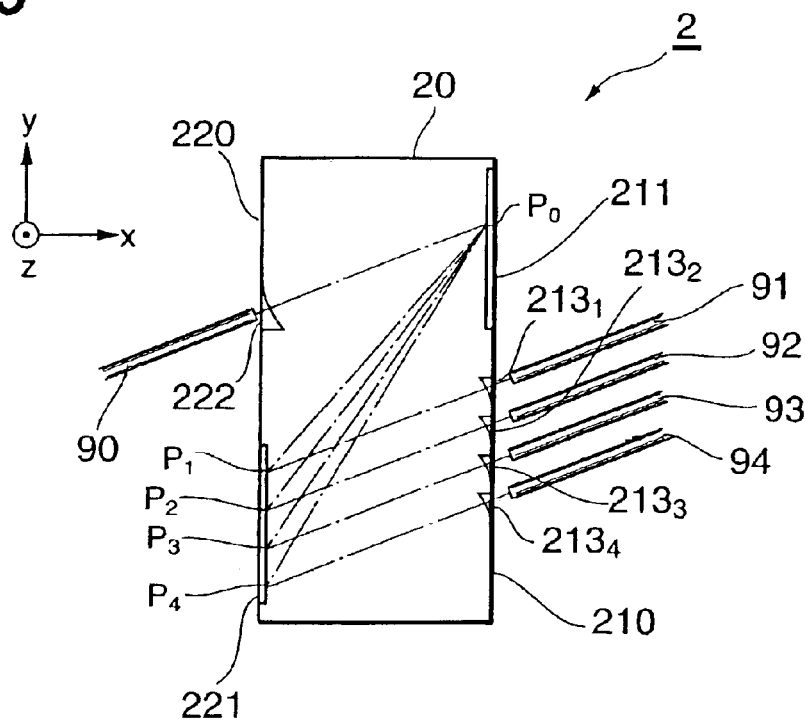
FIG. 5 is a plan view of optical signal processor 2 according to the second embodiment.

An optical signal processor according to the second embodiment of the present invention will be described next. FIG. 4 is a perspective view of a transparent member 20 included in an optical signal processor 2 according to the second embodiment. FIG. 5 is a plan view of optical signal processor 2 according to the second embodiment. FIGS. 4 and 5 also show an x-y-z Cartesian coordinate system for the descriptive convenience. FIG. 5 shows the optical signal processor viewed from the direction of z-axis. The optical paths of the light components of the respective wavelengths are indicated by alternate long and short dashed lines. Note that in FIG. 5 the refraction that occurs when light enters transparent member 20 from an air space or when light exits from transparent member 20 to an air space is ignored. Namely, in FIG. 5 the optical paths are depicted to proceed straight across the boundary between transparent member 20 and the air space. Also, in FIGS. 7, 8, 10, 13, 16, and 19, the optical paths are depicted in the same way as in FIG. 5. Optical signal processor 2 according to the second embodiment comprises transparent member 20 and optical fibers 90 to 94.

Transparent member 20 is made of a material that is transparent in the use wavelength band. For example, transparent member 20 is made of silica glass or a plastic generally used for an optical lens and the like. Transparent member 20 has a first surface 210 and a second surface 220, which are parallel to each other. A reflecting first diffraction grating 211 serving as a first spatial wavelength branch means is formed on first surface 210 of transparent member 20. A reflecting second diffraction grating 221 serving as a second spatial wavelength branch means is formed on second surface 220 of transparent member 20. First surface 210 and second surface 220 are parallel to the y-z plane. First diffraction grating 211 and second diffraction grating 221 have grating directions parallel to the z-axis, identical grating periods, and identical structures. Each of first diffraction grating 211 and second diffraction grating 221 has a reflection coating of a metal such as aluminum or gold. With this structure, light is efficiently diffracted.

An optical input window 222 is formed in a region where second diffraction grating 221 is not formed on second surface 220 of transparent member 20. Optical input window 222 has a convex-lens-shaped surface. Optical input window 222 focuses light which is output from transparent member 20 onto the end face of optical fiber 90 or collimates light which is output from the end face of optical fiber 90 and propagates the light into transparent member 20.

Optical output windows $213_1$ to $213_4$ are formed in a region where first diffraction grating 211 is not formed on first surface 210 of transparent member 20. Each of optical output windows $213_1$ to $213_4$ has a convex-lens-shaped surface. Each of optical output windows $213_1$ to $213_4$ focuses light which is output from transparent member 20 onto the end face of a corresponding one of optical fibers 91 to 94 or collimates light which is output from the end face of a corresponding one of optical fibers 91 to 94 and propagates the light into transparent member 20.

In this embodiment, optical input window 222 and optical output windows $213_1$ to $213_4$ have the collimator function. Hence, optical fibers 90 to 94 have no collimator function. Optical fibers 90 to 94 are arranged such that their optical axes become parallel to the x-y plane and parallel to each other.

The relative positional relationship between optical input window 222, optical output windows $213_1$ to $213_4$, first diffraction grating 211, and second diffraction grating 221 is as follows. Let $\beta_0$ be the incident angle of light at first diffraction grating 211, $\beta_n$ be the diffraction angle of light having a wavelength $\lambda_n$ at first diffraction grating 211, $\Lambda$ be the grating spacing of first diffraction grating 211, N be the refractive index of transparent member 20, and m be the diffraction order. Then, $$m\lambda_n = N\Lambda(\sin \beta_0 + \sin \beta_n) \qquad (1)$$

holds (n=1, 2, 3, 4). Also, let $P_0$ be the input position of light on first surface 210, $P_n$ be the input position of light having wavelength $\lambda_n$ on second surface 220, and $\Delta t$ be the distance between first surface 210 and second surface 220. Then, a distance $L_n$ between points $P_0$ and $P_n$ in the y-axis direction is given by $\Delta t \cdot \tan \beta_n$. The angle made by the optical axis of the lens of optical input window 222 and the normal to first surface 210 is set to $\beta_0$, and the angle made by the optical axis of the lens of optical output window $213_n$ and the normal to second surface 220 is set to $\beta_0$. First diffraction grating 211 is formed in a region including intersection $P_0$ between first surface 210 and the optical axis of the lens of optical input window 222. Second diffraction grating 221 is formed in a region including intersections $P_n$ between second surface 220 and the optical axis of the lens of optical output window $213_n$.

More specifically, optical signal processor 2 according to the second embodiment has the following structure. Transparent member 20 is made of silica glass. An interval $\Delta t$ between first surface 210 and second surface 220 of transparent member 20 is 30 mm. A grating spacing $\Lambda$ of each of first diffraction grating 211 and second diffraction grating 221 is 1.67 $\mu$m. An incident angle $\beta_0$ of light input from optical input window 222 to first diffraction grating 211 is 15°. When diffraction order m is 1, a wavelength $\lambda_1$ of light transmitted from optical fiber 90 to optical fiber 91 is 1,510 nm, a wavelength $\lambda_2$ of light transmitted from optical fiber 90 to optical fiber 92 is 1,530 nm, a wavelength $\lambda_3$ of light transmitted from optical fiber 90 to optical fiber 93 is 1,550 nm, and a wavelength $\lambda_4$ of light transmitted from optical fiber 90 to optical fiber 94 is 1,570 nm. In the y-axis direction, distance $L_1$, between points $P_0$ and $P_1$ is 11.8 mm, and distance $L_4$ between points $P_0$, and $P_4$ is 12.8 mm. The region where second diffraction grating 221 is formed on second surface 220 preferably includes the region between points $P_1$ and $P_4$ and its outer region of about 2 mm from points $P_1$, and $P_4$ in the y-axis direction. The region where first diffraction grating 211 is formed on first surface 210 preferably includes the region stretching about 2 mm from point $P_0$, in the y-axis direction.

Optical signal processor 2 operates as an optical demultiplexer in the following way. Light output from the distal end of optical fiber 90 is input to optical input window 222 formed in second surface 220 of transparent member 20. The light is collimated by optical input window 222 and propagates through transparent member 20 toward first surface 210 of transparent member 20. First diffraction grating 211 is formed in the region including the position at which the light is input from optical input window 222 to first surface 210. The light input to first diffraction grating 211 is diffracted by first diffraction grating 211 at diffraction angles corresponding to wavelengths and thus wavelength-branched. After that, the branched light propagates through transparent member 20 toward second surface 220 of transparent member 20. Second diffraction grating 221 is formed in the region including the position at which the branched light components of the respective wavelengths are input to second surface 220.

The light components of the respective wavelengths, which are input to second diffraction grating 221, are diffracted by second diffraction grating 221 and propagate through transparent member 20 in parallel toward first surface 210 of transparent member 20. Each of optical output windows $213_1$ to $213_4$ is formed in the region including the position at which the corresponding light components is input from second diffraction grating 221 to first surface 210. The light component having wavelength $\lambda_1$, which is input to optical output window $213_1$, is focused into the end face of optical fiber 91 by optical output window $213_1$ and propagates through optical fiber 91. The light component having wavelength $\lambda_2$, which is input to optical output window $213_2$, is focused into the end face of optical fiber 92 by optical output window $213_2$ and propagates through optical fiber 92. The light component having wavelength $\lambda_3$, which is input to optical output window $213_3$, is focused into the end face of optical fiber 93 by optical output window $213_3$ and propagates through optical fiber 93. The light component having wavelength $\lambda_4$, which is input to optical output window $213_4$, is focused into the end face of optical fiber 94 by optical output window $213_4$ and propagates through optical fiber 94.

In this way, optical signal processor 2 wavelength-branches the light output from the distal end of optical fiber 90 through first diffraction grating 211 and second diffraction grating 221 of transparent member 20, and then, outputs the branched light components of the respective wavelengths from the transparent member 20 in parallel. Optical signal processor 2 causes light having wavelength $\lambda_1$, which is output from transparent member 20 and reaches the distal end of optical fiber 91, to propagate through the optical fiber 91, causes light having wavelength $\lambda_2$, which reaches the distal end of optical fiber 92, to propagate through the optical fiber 92, causes light having wavelength $\lambda_3$, which reaches the distal end of optical fiber 93, to propagate through the optical fiber 93, and causes light having wavelength $\lambda_4$, which reaches the distal end of optical fiber 94, to propagate through the optical fiber 94. Thus, optical signal processor 2 can operate as an optical demultiplexer.

Optical signal processor 2 also multiplexes light having wavelength $\lambda_1$, which is output from the distal end of optical fiber 91, light having wavelength $\lambda_2$, which is output from the distal end of optical fiber 92, light having wavelength $\lambda_3$, which is output from the distal end of optical fiber 93, and light having wavelength $\lambda_4$, which is output from the distal end of optical fiber 94 through second diffraction grating 221 and first diffraction grating 211 of transparent member 20 and outputs the multiplexed light from transparent member 20. Then, optical signal processor 2 causes the light having wavelengths $\lambda_1$ to $\lambda_4$ to enter optical fiber 90. Thus, optical signal processor 2 can also operate as an optical multiplexer.

As described above, optical signal processor 2 according to the second embodiment can operate as an optical multiplexer or an optical demultiplexer and has the same effect as that of optical signal processor 1 according to the first embodiment. Additionally, in optical signal processor 2 according to the second embodiment, optical input window 222 and optical output windows $213_1$ to $213_4$ which have the collimator function are formed in transparent member 20. Optical fibers 90 to 94 having no collimator function can be used. Hence, the optical signal processor can be inexpensive.

(Third Embodiment)

Figure 6:
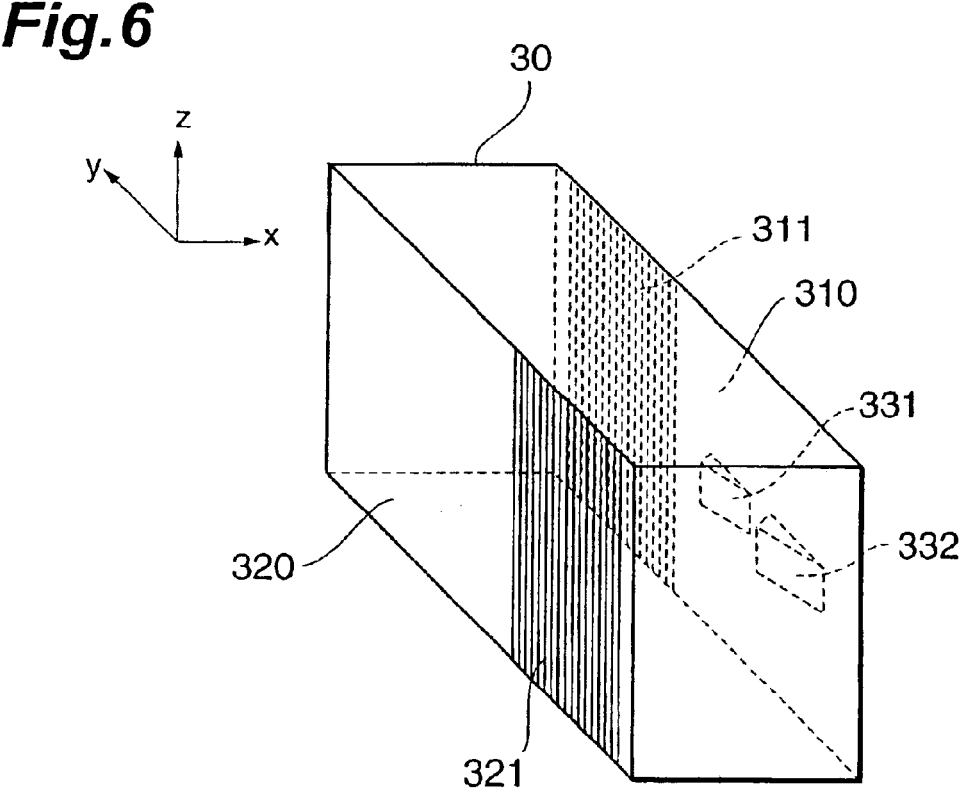
FIG. 6 is a perspective view of a transparent member 30 included in an optical signal processor 3 according to the third embodiment.
Figure 7:
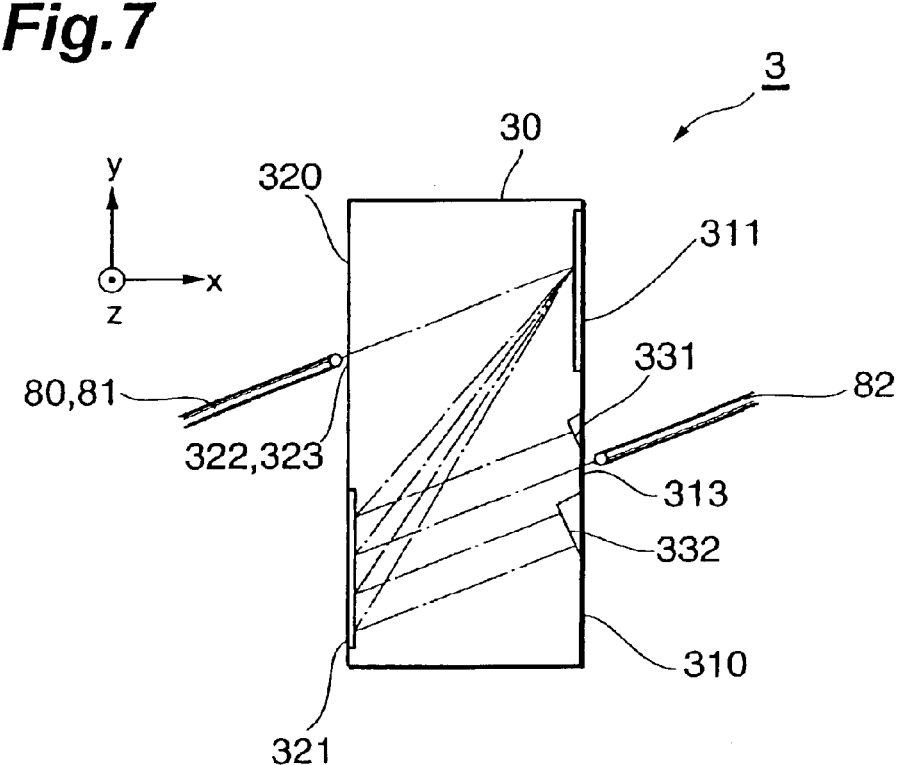
FIG. 7 is a plan view of optical signal processor 3 according to the third embodiment.
Figure 8:
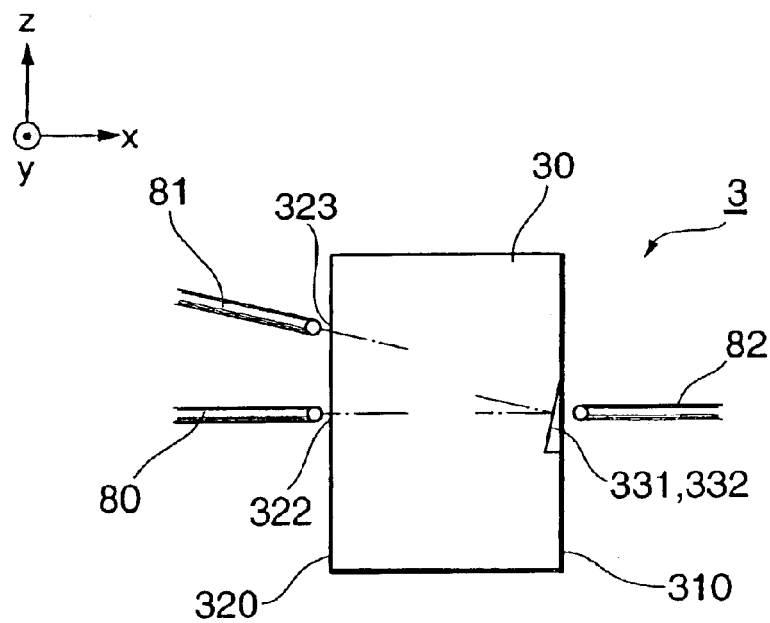
FIG. 8 is a side view of optical signal processor 3 according to the third embodiment.

An optical signal processor according to the third embodiment of the present invention will be described next. FIG. 6 is a perspective view of a transparent member 30 included in an optical signal processor 3 according to the third embodiment. FIG. 7 is a plan view of optical signal processor 3 according to the third embodiment. FIG. 8 is a side view of optical signal processor 3 according to the third embodiment. FIGS. 6 to 8 also show an x-y-z Cartesian coordinate system for the descriptive convenience. FIG. 7 shows the optical signal processor viewed from the direction of z-axis. FIG. 8 shows the optical signal processor viewed from the direction of y-axis. The optical paths of the light components of the respective wavelengths are indicated by alternate long and short dashed lines in FIGS. 7 and 8. Optical signal processor 3 according to the third embodiment comprises transparent member 30 and optical fiber collimators 80 to 82.

Transparent member 30 is made of a material that is transparent in the use wavelength band. For example, transparent member 30 is made of silica glass or a plastic generally used for an optical lens and the like. Transparent member 30 has a first surface 310 and a second surface 320, which are parallel to each other. A reflecting first diffraction grating 311 serving as a first spatial wavelength branch means is formed on first surface 310 of transparent member 30. A reflecting second diffraction grating 321 serving as a second spatial wavelength branch means is formed on second surface 320 of transparent member 30. First surface 310 and second surface 320 are parallel to the y-z plane. First diffraction grating 311 and second diffraction grating 321 have grating directions parallel to the z-axis, identical grating periods, and identical structures. Each of first diffraction grating 311 and second diffraction grating 321 has a reflection coating of a metal such as aluminum or gold.

An optical input window 322 and an optical output window 323 are formed in a region where second diffraction grating 321 is not formed on second surface 320 of transparent member 30. An optical output window 313 is formed in a region where first diffraction grating 311 is not formed on first surface 310 of transparent member 30. Optical input window 322 and optical output windows 323 and 313 have flat surfaces, unlike the second embodiment. In this embodiment, therefore, optical fiber collimators 80 to 82 each having a collimator function are used. Optical input window 322 and optical output window 323 are located at the same position in the x-y plane. Optical fiber collimators 80 to 82 are arranged such that their optical axes projected onto the x-y plane become parallel to each other.

Reflecting mirrors 331 and 332 each serving as an optical path returning means are formed in a region where first diffraction grating 311 is not formed on first surface 310 of transparent member 30. Reflecting mirrors 331 and 332 are ground to have predetermined tilted surfaces. A reflecting coating made of a metal such as aluminum or gold is formed on each tilted surface. Reflecting mirror 331 deflects the optical path of light having a wavelength $\lambda_1$, which is output from second diffraction grating 321, to second diffraction grating 321. Reflecting mirror 332 deflects the optical path of each of light components having wavelengths $\lambda_3$ and $\lambda_4$, which are output from second diffraction grating 321, to second diffraction grating 321. Reflecting mirrors 331 and 332 return a light such that the incident light path (forwarding path) and reflected light path (returning path) projected to the x-y plane coincide with each other. The reflecting surface of each of reflecting mirrors 331 and 332 tilts by an angle $\beta_0$ (an angle made by the normal to first surface 310 and the optical axis of optical fiber collimators 80 and 81 on the x-y plane) with respect to the y-z plane when viewed as a section parallel to the x-y plane (FIG. 7) and also tilts with respect to y-z plane when viewed as a section parallel to the x-z plane (FIG. 8). The optical axes of optical fiber collimators 80 and 82 are parallel to the x-y plane. The optical axis of optical fiber collimator 81 tilts with respect to the x-y plane (FIG. 8).

Optical signal processor 3 operates as an optical demultiplexer in the following way. Light collimated and output from the distal end of optical fiber collimator 80 is input to optical input window 322 of second surface 320 of transparent member 30. The light propagates through transparent member 30 from optical input window 322 to first surface 310 of transparent member 30. First diffraction grating 311 is formed in the region including the position at which the light is input from optical input window 322 to first surface 310. The light input to first diffraction grating 311 is diffracted by first diffraction grating 311 at diffraction angles corresponding to wavelengths and thus wavelength-branched. After that, the light propagates through transparent member 30 toward second surface 320 of transparent member 30. Second diffraction grating 321 is formed in the region including the position at which the branched light components of the respective wavelengths are input to second surface 320.

The light components of the respective wavelengths, which are input to second diffraction grating 321, are diffracted by second diffraction grating 321 and propagate through transparent member 30 in parallel toward first surface 310 of transparent member 30. Optical output window 313 is formed in the region including the position at which the light component having wavelength $\lambda_2$ is input from second diffraction grating 321 to first surface 310. The light component having wavelength $\lambda_2$ output from optical output window 313 is input to the distal end of optical fiber collimator 82, focused, and propagates through optical fiber.

Reflecting mirror 331 is formed in the region including the position at which the light component having wavelength $\lambda_1$ is input from second diffraction grating 321 to first surface 310. The optical path of the light component having wavelength $\lambda_1$, which is input to reflecting mirror 331, is deflected by reflecting mirror 331. Reflecting mirror 332 is formed in the region including the positions at which the light components having wavelengths $\lambda_3$ and $\lambda_4$ are input from second diffraction grating 321 to first surface 310. The optical paths of the light components having wavelengths $\lambda_3$ and $\lambda_4$, which are input to reflecting mirror 332, are deflected by reflecting mirror 332. The light components having wavelengths $\lambda_1$, $\lambda_3$, and $\lambda_4$, whose optical paths are deflected by reflecting mirrors 331 and 332, propagate through the returning path which is reverse to the forwarding path when projected to the x-y plane, are multiplexed through second diffraction grating 321 and first diffraction grating 311, and output from optical output window 323 of second surface 320. The multiplexed light is input to the distal end of optical fiber collimator 81, focused, and propagates through the optical fiber.

In this way, optical signal processor 3 wavelength-branches the light output from the distal end of optical fiber collimator 80 through first diffraction grating 311 and second diffraction grating 321 of transparent member 30, outputs the light component having wavelength $\lambda_2$, which reaches optical output window 313, to optical fiber collimator 82. Optical signal processor 3 multiplexes the light components having wavelengths $\lambda_1$, $\lambda_3$, and $\lambda_4$, which reach reflecting mirrors 331 and 332, through second diffraction grating 321 and first diffraction grating 311 and outputs the multiplexed light to optical fiber collimator 81. As described above, optical signal processor 3 can receive light having wavelengths $\lambda_1$ to $\lambda_4$ and branch the light into the light component having wavelength $\lambda_2$ and the light components having wavelengths $\lambda_1$, $\lambda_3$, and $\lambda_4$. Thus, the optical signal processor can operate as an optical demultiplexer.

Optical signal processor 3 also multiplexes light having wavelength $\lambda_2$, which is output from the distal end of optical fiber collimator 82, and light having wavelengths $\lambda_1$, $\lambda_3$, and $\lambda_4$, which is output from the distal end of optical fiber collimator 81, through first diffraction grating 311 and second diffraction grating 321 of transparent member 30 and outputs the multiplexed light from transparent member 30. Then, optical signal processor 3 causes the light having wavelengths $\lambda_1$ to $\lambda_4$ to enter optical fiber collimator 80. As described above, optical signal processor 3 can receive the light component having wavelength $\lambda_2$ and light components having wavelengths $\lambda_1$, $\lambda_3$, and $\lambda_4$, multiplex these light components, and output the multiplexed light. Thus, the optical signal processor can also operate as an optical multiplexer.

Figure 9A:
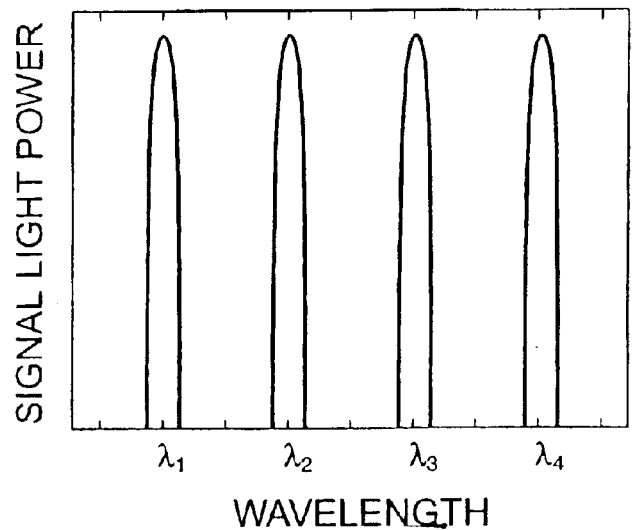
FIGS. 9A to 9C are graphs showing the spectrum characteristics of optical signal processor 3 according to the third embodiment.
Figure 9B:
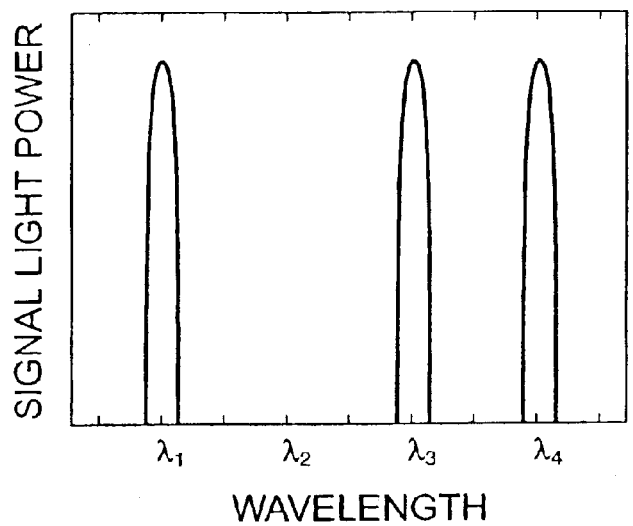
Figure 9C:
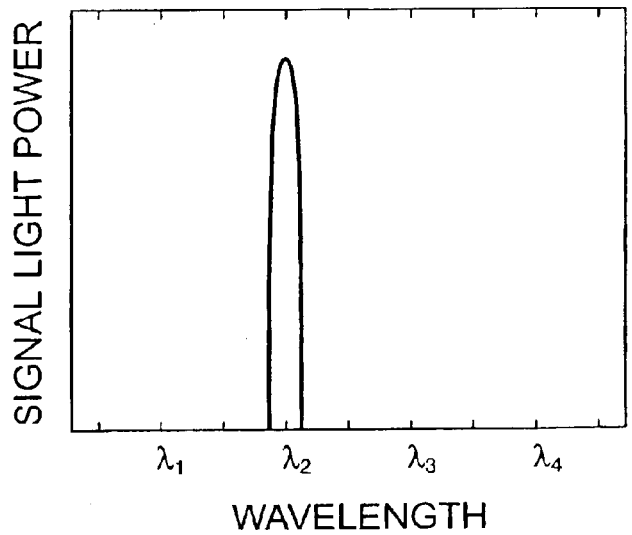

FIGS. 9A to 9C are graphs showing the spectrum characteristics of optical signal processor 3 according to the third embodiment. FIG. 9A shows the spectrum of light which is input from the distal end of optical fiber collimator 80 to optical input window 322 of transparent member 30. FIG. 9B shows the spectrum of light which is output from optical output window 323 of transparent member 30 to the distal end of optical fiber collimator 81. FIG. 9C shows the spectrum of light which is output from optical output window 313 of transparent member 30 to the distal end of optical fiber collimator 82. As shown in FIGS. 9A to 9C, when the light having wavelengths $\lambda_1$ to $\lambda_4$ is input from the distal end of optical fiber collimator 80 to optical input window 322 of transparent member 30, the light having wavelengths $\lambda_1$, $\lambda_3$, and $\lambda_4$ is output from optical output window 323 of transparent member 30 to the distal end of optical fiber collimator 81. The light component having wavelength $\lambda_2$ is output from optical output window 313 of transparent member 30 to the distal end of optical fiber collimator 82. Conversely, when the light having wavelengths $\lambda_1$, $\lambda_3$, and $\lambda_4$ is input from the distal end of optical fiber collimator 81 to optical output window 323 of transparent member 30, and the light component having wavelength $\lambda_2$ is input from the distal end of optical fiber collimator 82 to optical output window 313 of transparent member 30, the light components are multiplexed. Hence, the light having wavelengths $\lambda_1$ to $\lambda_4$ is output from optical input window 322 of transparent member 30 to the distal end of optical fiber collimator 80.

As described above, optical signal processor 3 according to the third embodiment can operate as an optical multiplexer or an optical demultiplexer and has the same effect as that of optical signal processor 1 according to the first embodiment. Especially, optical signal processor 3 can branches multi-wavelength light into two wavelength ranges. Also, optical signal processor 3 can multiplex two lights of different wavelength ranges.

Figure 10:
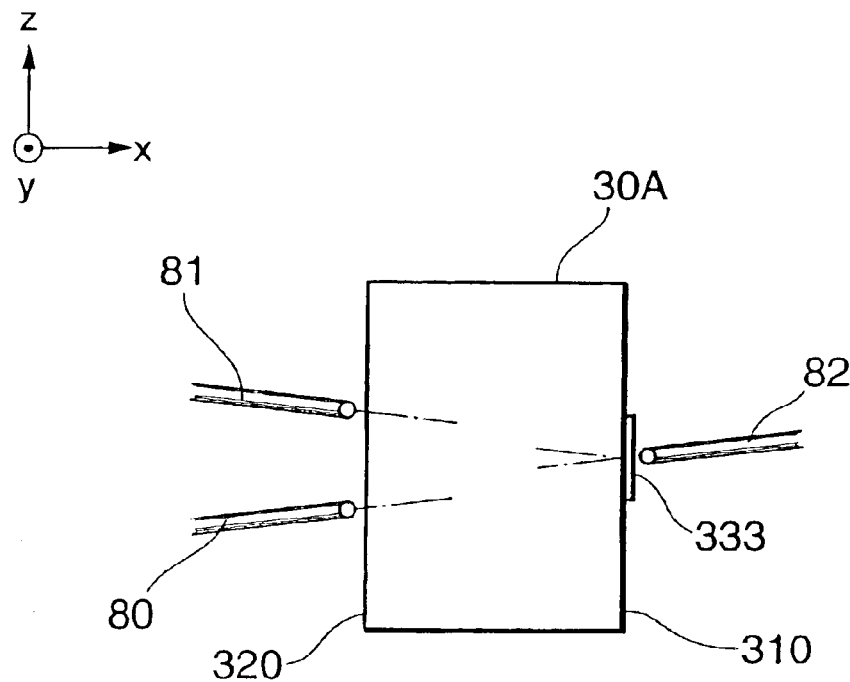
FIG. 10 is a side view of the first modification of optical signal processor 3 according to the third embodiment.
Figure 11:
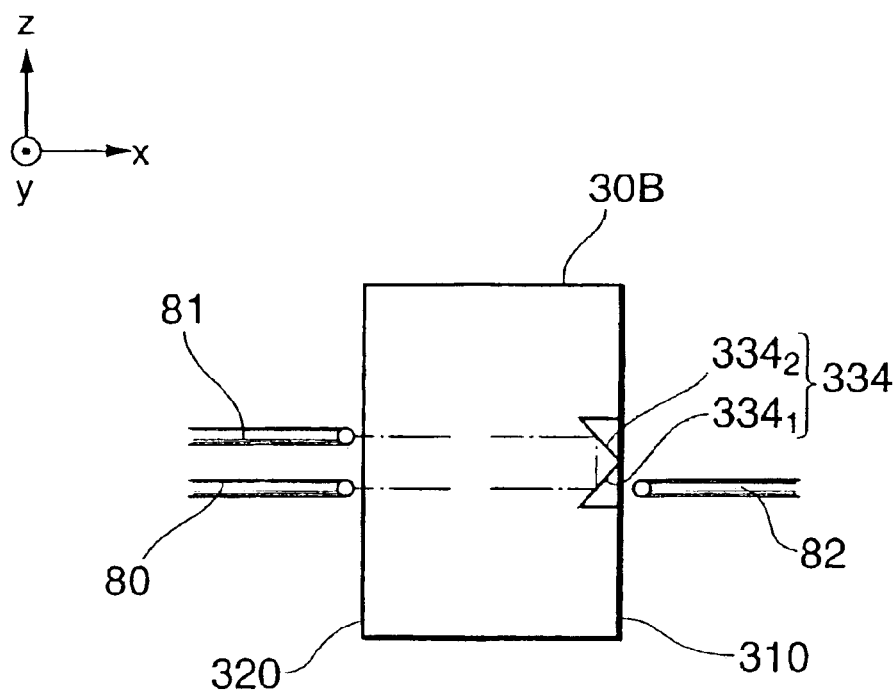
FIG. 11 is a side view of the second modification of optical signal processor 3 according to the third embodiment.

As the optical path returning means arranged on first surface 310 side, not only the reflecting mirror with the above-described structure but also a reflecting mirror having an arrangement shown in FIG. 10 or 11 may be used.

FIG. 10 is a side view of the first modification of optical signal processor 3 according to the third embodiment, which is viewed from the direction of y-axis. A reflecting mirror 333 serving as an optical path returning means shown in FIG. 10 is formed in a region where first diffraction grating 311 is not formed on first surface 310 of a transparent member 30A. Reflecting mirror 333 is ground to have a predetermined tilted surface. A reflecting coating made of a metal such as aluminum or gold is formed on the tilted surface. The reflecting surface of reflecting mirror 333 tilts by angle $\beta_0$ (an angle made by the normal to first surface 310 and the optical axis of optical fiber collimators 80 and 81 on the x-y plane) with respect to the y-z plane when viewed as a section parallel to the x-y plane (FIG. 7). The reflecting surface is parallel to the y-z plane when viewed as a section parallel to the x-z plane. The optical axes of optical fiber collimators 80 and 82 projected onto the x-z plane tilt with respect to the x-y plane.

FIG. 11 is a side view of the second modification of optical signal processor 3 according to the third embodiment, which is also viewed from the direction of y-axis. A rectangular prism 334 serving as an optical path returning means shown in FIG. 11 is formed in a region where first diffraction grating 311 is not formed on first surface 310 of a transparent member 30B. Rectangular prism 334 includes reflecting mirrors 334$_1$, and 334$_2$. Reflecting mirrors 334$_1$ and 334$_2$ are ground to have predetermined tilted surfaces. A reflecting coating made of a metal such as aluminum or gold is formed on each tilted surface. The reflecting surface of each of reflecting mirrors 334$_1$ and 334$_2$ projected onto the x-z plane tilts by 45° with respect to the x-y plane. The reflecting surfaces are perpendicular to each other and thus form rectangular prism 334. The nodal lines of the reflecting surfaces of reflecting mirrors 334$_1$ and 334$_2$ are parallel to the x-y plane and tilt by angle $\beta_0$ (an angle made by the normal to first surface 310 and the optical axis of optical fiber collimators 80 and 81 on the x-y plane) with respect to the y-z plane. The optical axes of optical fiber collimators 80 to 82 are parallel to the x-y plane. Rectangular prism 334 sequentially reflects light output from second diffraction grating 321 by reflecting mirror 334$_1$, and reflecting mirror 334$_2$ to return the optical path.

(Fourth Embodiment)

Figure 12:
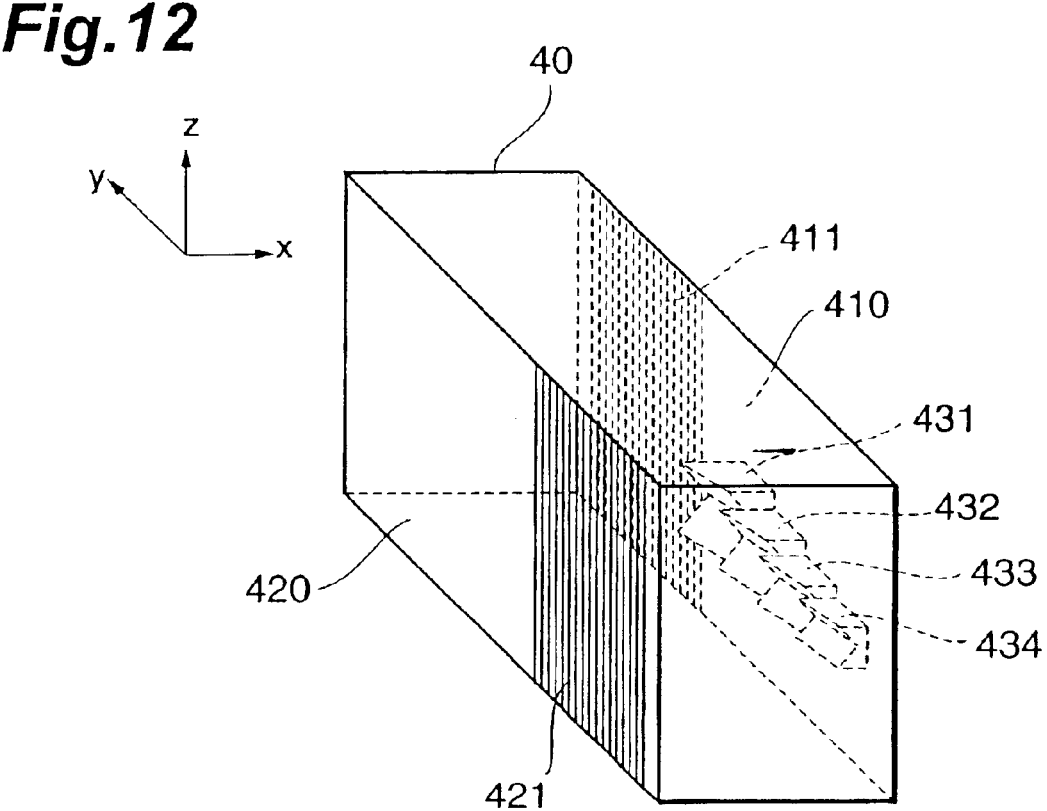
FIG. 12 is a perspective view of a transparent member 40 included in an optical signal processor 4 according to the fourth embodiment.
Figure 13:
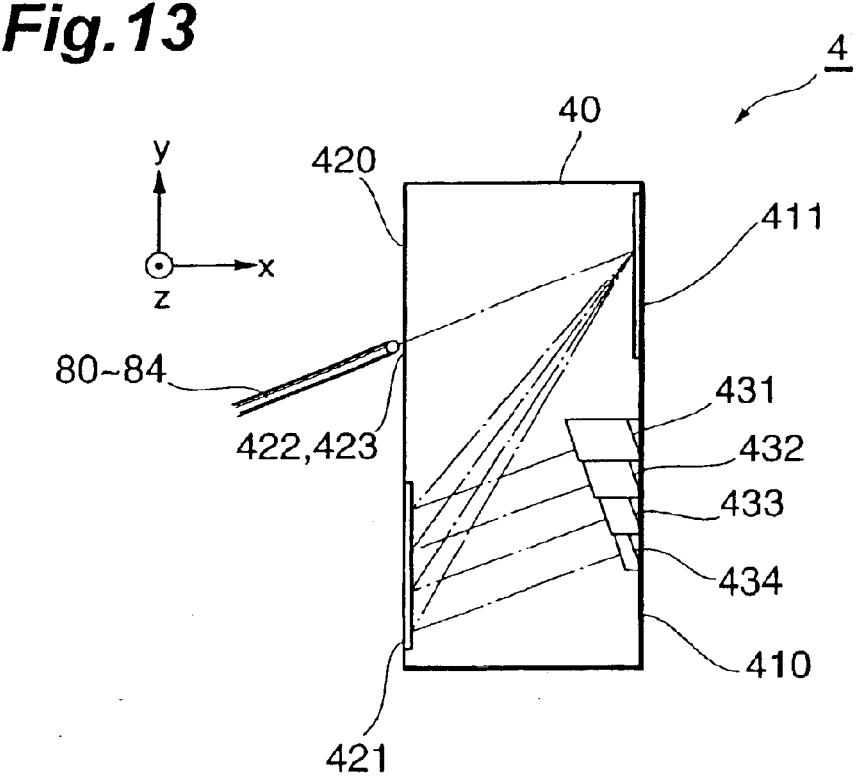
FIG. 13 is a plan view of optical signal processor 4 according to the fourth embodiment.

An optical signal processor according to the fourth embodiment of the present invention will be described next. FIG. 12 is a perspective view of a transparent member 40 included in an optical signal processor 4 according to the fourth embodiment. FIG. 13 is a plan view of optical signal processor 4 according to the fourth embodiment. FIGS. 14A to 14D are side views of optical signal processor 4 according to the fourth embodiment. FIGS. 12 to 14D also show an x-y-z Cartesian coordinate system for the descriptive convenience. FIG. 13 shows the optical signal processor viewed from the direction of z-axis. FIGS. 14A to 14D show the optical signal processor viewed from the direction of y-axis. The optical paths of the light components of the respective wavelengths are indicated by alternate long and short dashed lines in FIGS. 13 and 14. FIGS. 14A to 14D show sections at different positions in the y-axis direction. Optical signal processor 4 according to the fourth embodiment comprises transparent member 40 and optical fiber collimators 80 to 84.

Transparent member 40 is made of a material that is transparent in the use wavelength band. For example, transparent member 40 is made of silica glass or a plastic generally used for an optical lens and the like. Transparent member 40 has a first surface 410 and a second surface 420, which are parallel to each other. A reflecting first diffraction grating 411 serving as a first spatial wavelength branch means is formed on first surface 410 of transparent member 40. A reflecting second diffraction grating 421 serving as a second spatial wavelength branch means is formed on second surface 420 of transparent member 40. First surface 410 and second surface 420 are parallel to the y-z plane. First diffraction grating 411 and second diffraction grating 421 have grating directions parallel to the z-axis, identical grating periods, and identical structures. Each of first diffraction grating 411 and second diffraction grating 421 has a reflection coating of a metal such as aluminum or gold.

An optical input window 422 and optical output windows 423$_1$ to 423$_4$ are formed in a region where second diffraction grating 421 is not formed on second surface 420 of transparent member 40. Optical input window 422 and optical output windows 423$_1$ to 423$_4$ have flat surfaces. In this embodiment, therefore, optical fiber collimators 80 to 84 each having a collimator function are used. The optical axes of optical fiber collimators 80 to 84 are parallel to the x-y plane. The optical axes projected onto the x-y plane coincide with each other.

Rectangular prisms 431 to 434 each serving as an optical path returning means are formed in a region where first diffraction grating 411 is not formed on first surface 410 of transparent member 40. Each of rectangular prisms 431 to 434 has the same structure as that of rectangular prism 334 shown in FIG. 11. Rectangular prism 431 includes reflecting mirrors 431$_1$ to 431$_2$. Rectangular prism 432 includes reflecting mirrors 432$_1$ to 432$_2$. Rectangular prism 433 includes reflecting mirrors 433$_1$ to 433$_2$. Rectangular prism 434 includes reflecting mirrors 434$_1$ to 434$_2$. Reflecting mirrors 431$_1$, 431$_2$, 432$_1$, 432$_2$, 433$_1$, 433$_2$, 434$_1$, and 434$_2$ are ground to have predetermined tilted surfaces. A reflecting coating made of a metal such as aluminum or gold is formed on each tilted surface.

The reflecting surface of each of reflecting mirrors 431$_1$ to 431$_2$ tilts by 45° with respect to the x-y plane. The reflecting surfaces are perpendicular to each other and thus form rectangular prism 431. The nodal lines of the reflecting surfaces of reflecting mirrors 431$_1$ to 431$_2$ are parallel to the x-y plane and tilt by angle $\beta_0$ (an angle made by the normal to first surface 410 and the optical axis of optical fiber collimators 80–84 on the x-y plane) with respect to the y-z plane. Rectangular prism 431 sequentially reflects light output from second diffraction grating 421 by reflecting mirror 431$_1$ and reflecting mirror 431$_2$ to return the optical path. This also applies to rectangular prisms 431 to 434.

Figure 14A:
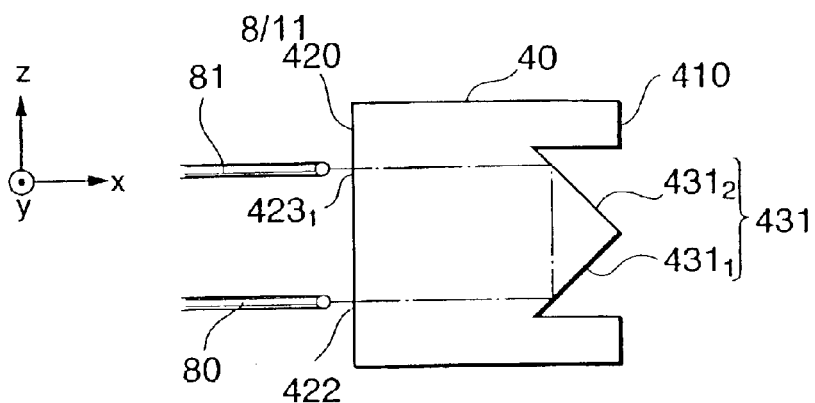
FIGS. 14A to 14D are side views of optical signal processor 4 according to the fourth embodiment.
Figure 14B:
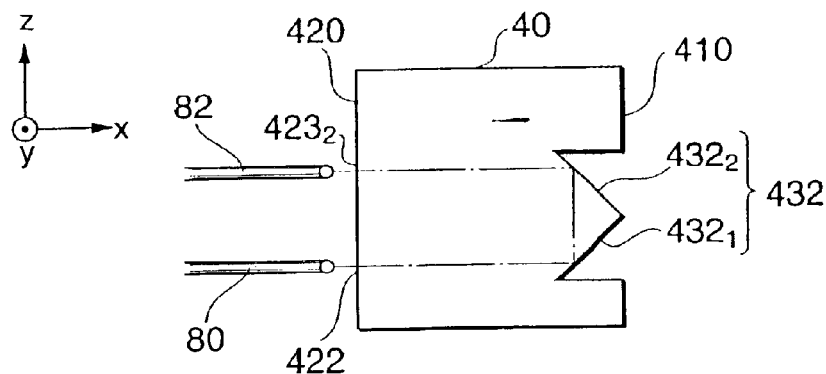
Figure 14C:
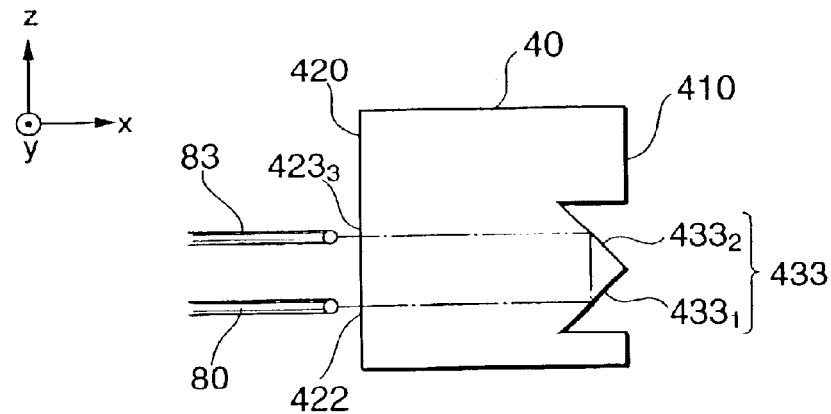
Figure 14D:
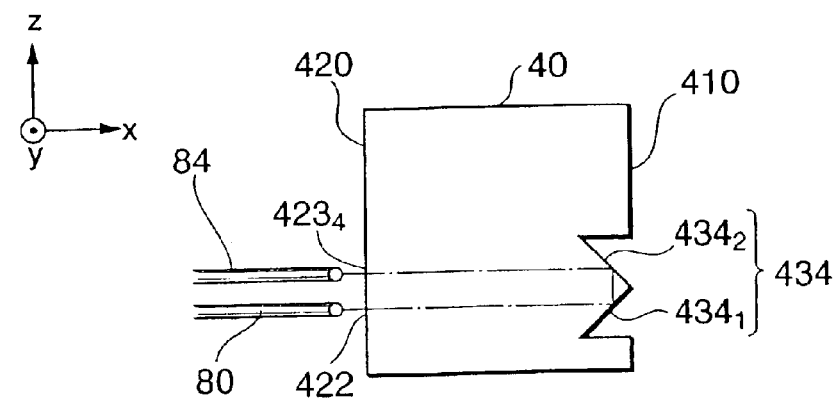

Each of rectangular prisms 431 to 434 serving as the optical path returning means outputs light from second diffraction grating 421 to the returning path which is reverse to the forwarding path when projected to the x-y plane. The optical paths of light components output from rectangular prisms 431 to 434 are different in the z-axis direction. FIG. 14A shows the deflection of the optical path of light having a wavelength $\lambda_1$ by rectangular prism 431. FIG. 14B shows the deflection of the optical path of light having a wavelength $\lambda_2$ by rectangular prism 432. FIG. 14C shows the deflection of the optical path of light having a wavelength $\lambda_3$ by rectangular prism 433. FIG. 14D shows the deflection of the optical path of light having a wavelength $\lambda_4$ by rectangular prism 434.

Optical signal processor 4 operates as an optical demultiplexer in the following way. Light collimated and output from the distal end of optical fiber collimator 80 is input to optical input window 422 of second surface 420 of transparent member 40. The light propagates through transparent member 40 from optical input window 422 to first surface 410 of transparent member 40. First diffraction grating 411 is formed in the region including the position at which the light is input from optical input window 422 to first surface 410. The light input to first diffraction grating 411 is diffracted by first diffraction grating 411 at diffraction angles corresponding to wavelengths and thus wavelength-branched. After that, the light propagates through transparent member 40 toward second surface 420 of transparent member 40. Second diffraction grating 421 is formed in the region including the positions at which the branched light components of the respective wavelengths are input to second surface 420.

The light components of the respective wavelengths, which are input to second diffraction grating 421, are diffracted by second diffraction grating 421 and propagate through transparent member 40 in parallel toward first surface 410 of transparent member 40. Rectangular prism 431 is formed in the region including the position at which the light component having wavelength $\lambda_1$ is input from second diffraction grating 421 to first surface 410. The optical path of the light component having wavelength $\lambda_1$, which is input to rectangular prism 431, is deflected by rectangular prism 431. Rectangular prism 432 is formed in the region including the position at which the light component having wavelength $\lambda_2$ is input from second diffraction grating 421 to first surface 410. The optical path of the light component having wavelength $\lambda_2$, which is input to rectangular prism 432, is deflected by rectangular prism 432. Rectangular prism 433 is formed in the region including the position at which the light component having wavelength $\lambda_3$ is input from second diffraction grating 421 to first surface 410. The optical path of the light component having wavelength $\lambda_3$ which is input to rectangular prism 433, is deflected by rectangular prism 433. Rectangular prism 434 is formed in the region including the position at which the light component having wavelength $\lambda_4$ is input from second diffraction grating 421 to first surface 410. The optical path of the light component having wavelength $\lambda_4$, which is input to rectangular prism 434, is deflected by rectangular prism 434.

The light component having wavelength $\lambda_1$, whose optical path is deflected by rectangular prism 431, propagates through the returning path which is reverse to the forwarding path when projected to the x-y plane, is multiplexed through second diffraction grating 421 and first diffraction grating 411, and output from optical output window 423$_1$ of second surface 420. The light is input to the distal end of optical fiber collimator 81, focused, and propagates through the optical fiber. The light component having wavelength $\lambda_2$, whose optical path is deflected by rectangular prism 432, propagates through the returning path which is reverse to the forwarding path when projected to the x-y plane, is multiplexed through second diffraction grating 421 and first diffraction grating 411, and output from optical output window 423$_2$ of second surface 420. The light is input to the distal end of optical fiber collimator 82, focused, and propagates through the optical fiber. The light component having wavelength $\lambda_3$, whose optical path is deflected by rectangular prism 433, propagates through the returning path which is reverse to the forwarding path when projected to the x-y plane, is multiplexed through second diffraction grating 421 and first diffraction grating 411, and output from optical output window 423$_3$ of second surface 420. The light is input to the distal end of optical fiber collimator 83, focused, and propagates through the optical fiber. The light component having wavelength $\lambda_4$, whose optical path is deflected by rectangular prism 434, propagates through the returning path which is reverse to the forwarding path when projected to the x-y plane, is multiplexed through second diffraction grating 421 and first diffraction grating 411, and output from optical output window 423$_4$ of second surface 420. The light is input to the distal end of optical fiber collimator 84, focused, and propagates through the optical fiber.

In this way, optical signal processor 4 wavelength-branches the light output from the distal end of optical fiber collimator 80 through first diffraction grating 411 and second diffraction grating 421 of transparent member 40. Each of rectangular prisms 431 to 434 makes a corresponding one of the light components of the respective wavelengths pass through forwarding path and returning path which are different in the z-axis direction. The light components of the respective wavelengths are output to optical fiber collimators 81 to 84 through second diffraction grating 421 and first diffraction grating 411. As described above, optical signal processor 4 can operate as an optical demultiplexer.

Optical signal processor 4 also multiplexes the light component having wavelength $\lambda_1$, which is output from the distal end of optical fiber collimator 81, the light component having wavelength $\lambda_2$, which is output from the distal end of optical fiber collimator 82, the light component having wavelength $\lambda_3$, which is output from the distal end of optical fiber collimator 83, and the light component having wavelength $\lambda_4$ which is output from the distal end of optical fiber collimator 84, through first diffraction grating 411 and second diffraction grating 421 of transparent member 40 and outputs the multiplexed light from transparent member 40. Then, optical signal processor 4 causes the light having wavelengths $\lambda_1$ to $\lambda_4$ to enter optical fiber collimator 80. As described above, optical signal processor 4 can also operate as an optical multiplexer.

Figure 15:
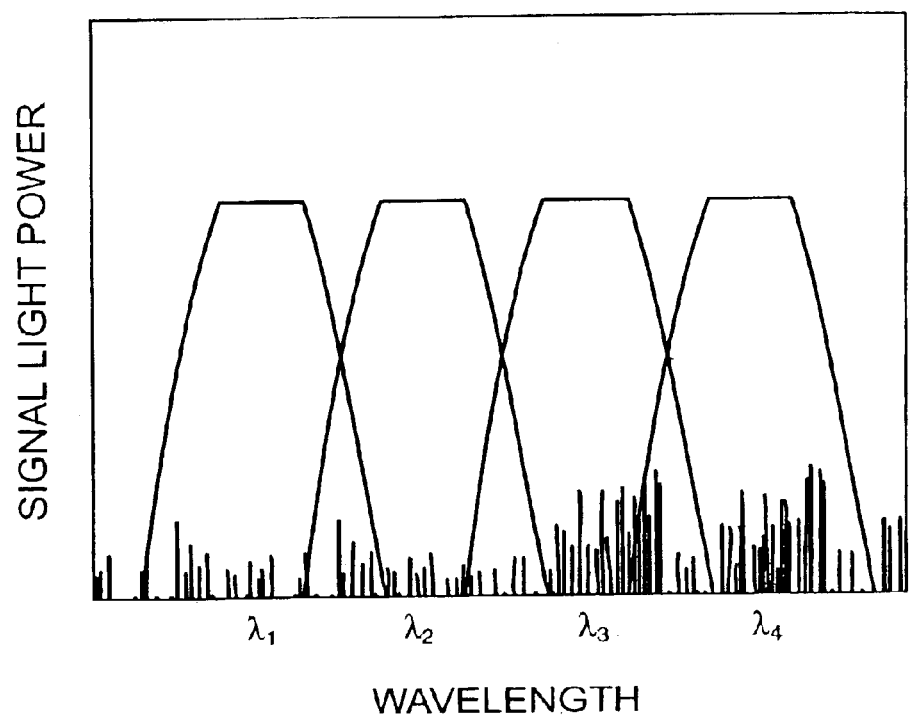
FIG. 15 is a graph showing the spectrum characteristics of optical signal processor 4 according to the fourth embodiment.

FIG. 15 is a graph showing the spectrum characteristics of optical signal processor 4 according to the fourth embodiment. Light which is output from the distal end of optical fiber collimator 80 and input to first diffraction grating 411 through optical input window 422 has a flat spectrum in a wide wavelength range. FIG. 15 shows the spectra of light components input to the distal ends of optical fiber collimators 81 to 84. As is apparent from FIG. 15, optical signal processor 4 can operate as an optical demultiplexer. As compared to the spectrum characteristics of optical signal processor 1 shown in FIG. 3, the spectrum characteristics of optical signal processor 4 shown in FIG. 15 are flat in the wavelength range centered on each of wavelengths $\lambda_1$ to $\lambda_4$. This is because in the returning path of light components from rectangular prisms 431 to 434 to optical fiber collimators 81 to 84, the returned light undergoes the same diffraction process as in the forwarding path of light components from optical fiber collimator 80 to rectangular prisms 431 to 434.

As described above, optical signal processor 4 according to the fourth embodiment can operate as an optical multiplexer or an optical demultiplexer and has the same effect as that of optical signal processor 1 according to the first embodiment. Additionally, optical signal processor 4 according to the fourth embodiment has the characteristics shown in FIG. 15. Hence, even when the wavelength of light to be demultiplexed or multiplexed slightly varies, or the center wavelength of demultiplexing or multiplexing varies due to a change in temperature or the like, desired optical characteristics can be maintained.

(Fifth Embodiment)

Figure 16:
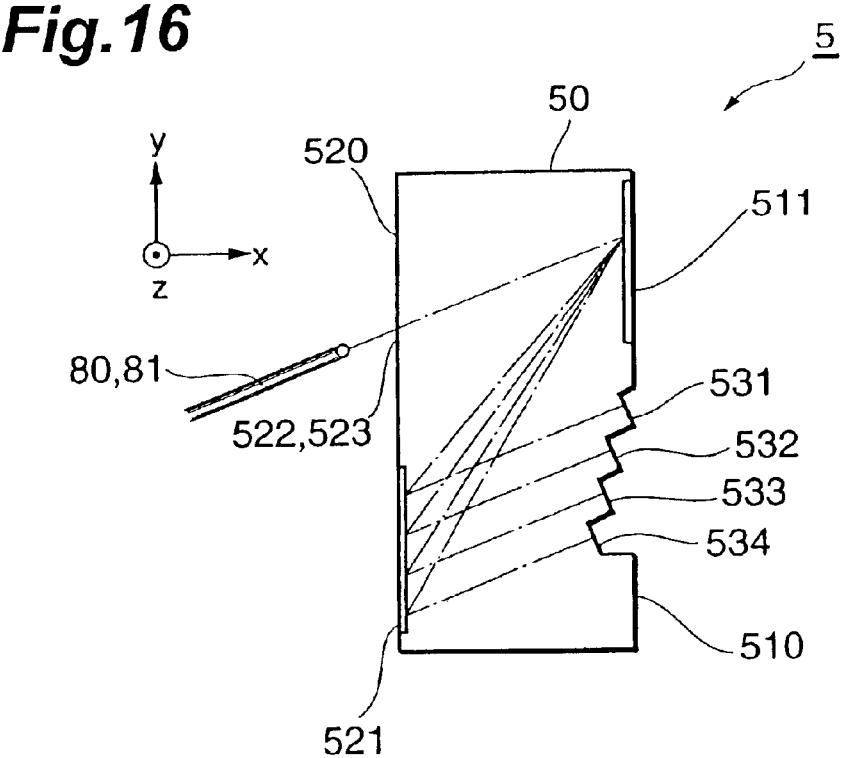
FIG. 16 is a plan view of an optical signal processor 5 according to the fifth embodiment.

An optical signal processor according to the fifth embodiment of the present invention will be described next. FIG. 16 is a plan view of an optical signal processor 5 according to the fifth embodiment. FIG. 16 also shows an x-y-z Cartesian coordinate system for the descriptive convenience. FIG. 16 shows the optical signal processor viewed from the direction of z-axis. The optical paths of the light components of the respective wavelengths are indicated by alternate long and short dashed lines in FIG. 16. Optical signal processor 5 according to the fifth embodiment comprises a transparent member 50 and optical fiber collimators 80 and 81.

Transparent member 50 is made of a material that is transparent in the use wavelength band. For example, transparent member 50 is made of silica glass or a plastic generally used for an optical lens and the like. Transparent member 50 has a first surface 510 and a second surface 520, which are parallel to each other. A reflecting first diffraction grating 511 serving as a first spatial wavelength branch means is formed on first surface 510 of transparent member 50. A reflecting second diffraction grating 521 serving as a second spatial wavelength branch means is formed on second surface 520 of transparent member 50. First surface 510 and second surface 520 are parallel to the y-z plane. First diffraction grating 511 and second diffraction grating 521 have grating directions parallel to the z-axis, identical grating periods, and identical structures. Each of first diffraction grating 511 and second diffraction grating 521 has a reflection coating of a metal such as aluminum or gold.

An optical input window 522 and an optical output window 523 are formed in a region where second diffraction grating 521 is not formed on second surface 520 of transparent member 50. Optical input window 522 and optical output window 523 have flat surfaces. In this embodiment, therefore, optical fiber collimators 80 and 81 each having a collimator function are used. The optical axes of optical fiber collimators 80 and 81 projected onto the x-y plane coincide with each other.

Reflecting mirrors 531 to 534 each serving as an optical path returning means are formed in a region where first diffraction grating 511 is not formed on first surface 510 of transparent member 50. Each of reflecting mirrors 531 to 534 has the same structure as that of the reflecting mirror shown in FIG. 8 or 10. A reflecting coating made of a metal such as aluminum or gold is formed on the surface of each reflecting mirror. Each of reflecting mirrors 531 to 534 reflects light from second diffraction grating 421 and outputs the light to a returning path which is reverse to the forwarding path when projected to the x-y plane. The optical path deflecting positions by reflecting mirrors 531 to 534 change depending on the wavelength.

Optical signal processor 5 operates in the following way. Light collimated and output from the distal end of optical fiber collimator 80 is input to optical input window 522 of second surface 520 of transparent member 50. The light propagates through transparent member 50 from optical input window 522 to first surface 510 of transparent member 50. First diffraction grating 511 is formed in the region including the position at which the light is input from optical input window 522 to first surface 510. The light input to first diffraction grating 511 is diffracted by first diffraction grating 511 at diffraction angles corresponding to wavelengths and thus wavelength-branched. After that, the light propagates through transparent member 50 toward second surface 520 of transparent member 50. Second diffraction grating 521 is formed in the region including the positions at which the branched light components of the respective wavelengths are input to second surface 520.

The light components of the respective wavelengths, which are input to second diffraction grating 521, are diffracted by second diffraction grating 521 and propagate through transparent member 50 in parallel toward first surface 510 of transparent member 50. Reflecting mirror 531 is formed in the region including the position at which the light component having a wavelength $\lambda_1$ is input from second diffraction grating 521 to first surface 510. The optical path of the light component having wavelength $\lambda_1$, which is input to reflecting mirror 531, is deflected by reflecting mirror 531. Reflecting mirror 532 is formed in the region including the position at which the light component having a wavelength $\lambda_2$ is input from second diffraction grating 521 to first surface 510. The optical path of the light component having wavelength $\lambda_2$, which is input to reflecting mirror 532, is deflected by reflecting mirror 532. Reflecting mirror 533 is formed in the region including the position at which the light component having a wavelength $\lambda_3$ is input from second diffraction grating 521 to first surface 510. The optical path of the light component having wavelength $\lambda_3$, which is input to reflecting mirror 533, is deflected by reflecting mirror 533. Reflecting mirror 534 is formed in the region including the position at which the light component having a wavelength $\lambda_4$ is input from second diffraction grating 521 to first surface 510. The optical path of the light component having wavelength $\lambda_4$, which is input to reflecting mirror 534, is deflected by reflecting mirror 534.

The light components having wavelengths $\lambda_1$ to $\lambda_4$, whose optical paths are deflected by reflecting mirrors 531 to 534, propagate through the returning path which is reverse to the forwarding path when projected to the x-y plane, are multiplexed through second diffraction grating 521 and first diffraction grating 511, and output from optical output window 523 of second surface 520. The multiplexed light is input to the distal end of optical fiber collimator 81, focused, and propagates through the optical fiber.

In this way, optical signal processor 5 wavelength-branches the light output from the distal end of optical fiber collimator 80 through first diffraction grating 511 and second diffraction grating 521 of transparent member 50. Each of reflecting mirrors 531 to 534 makes a corresponding one of the light components of the respective wavelengths pass through forwarding path and returning path. The light components of the respective wavelengths are output to optical fiber collimator 81 through second diffraction grating 521 and first diffraction grating 511. The group delay of each of the light components having wavelengths $\lambda_1$ to $\lambda_4$, which is output from optical fiber collimator 80 and reaches optical fiber collimator 81, corresponds to the optical path deflecting position of each of reflecting mirrors 531 to 534. As described above, optical signal processor 5 can operate as a dispersion adjusting device.

As described above, optical signal processor 5 according to the fifth embodiment can operate as a dispersion adjusting device. In addition, optical signal processor 5 includes reflecting first diffraction grating 511 and second diffraction grating 521, which are formed on the surfaces of transparent member 50, as wavelength branch means. Such transparent member 50 can easily be formed by cutting or the like. When replicas are formed by using a mold, transparent members 50 can be mass-produced at a low cost. In addition, the relative position between first diffraction grating 511 and second diffraction grating 521 is fixed and can have the design value. Hence, optical signal processor 5 has desired optical characteristics and can easily be manufactured at a low cost. Furthermore, as in the fourth embodiment, optical signal processor 5 can maintain a desired optical characteristic even when the wavelength of light to be made dispersion adjustment slightly varies, or the center wavelength to be made dispersion adjustment varies due to a change in temperature or the like.

In this embodiment, not reflecting mirrors 531 to 534 but rectangular prisms having the structure shown in FIG. 11 may be used as the optical path returning means.

(Sixth Embodiment)

Figure 17:
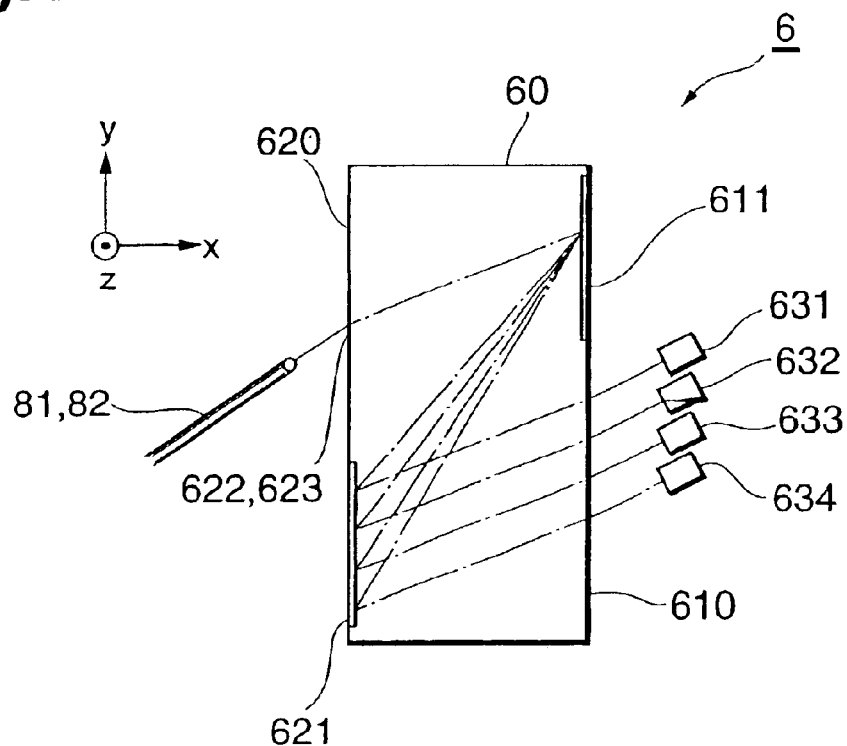
FIG. 17 is a plan view of an optical signal processor 6 according to the sixth embodiment.
Figure 18:
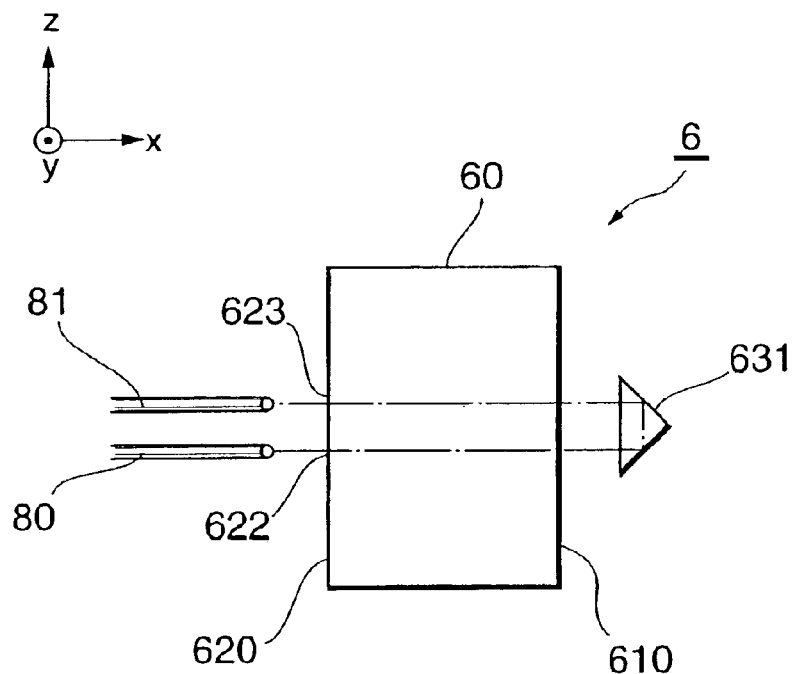
FIG. 18 is a side view of optical signal processor 6 according to the sixth embodiment.

An optical signal processor according to the sixth embodiment of the present invention will be described next. FIG. 17 is a plan view of an optical signal processor 6 according to the sixth embodiment. FIG. 18 is a side view of optical signal processor 6 according to the sixth embodiment. FIGS. 17 and 18 also show an x-y-z Cartesian coordinate system for the descriptive convenience. FIG. 17 shows the optical signal processor viewed from the direction of z-axis. FIG. 18 shows the optical signal processor viewed from the direction of y-axis. The optical paths of the light components of the respective wavelengths are indicated by alternate long and short dashed lines in FIGS. 17 and 18. Optical signal processor 6 according to the sixth embodiment comprises a transparent member 60, rectangular prisms 631 to 634, and optical fiber collimators 80 and 81.

Transparent member 60 is made of a material that is transparent in the use wavelength band. For example, transparent member 60 is made of silica glass or a plastic generally used for an optical lens and the like. Transparent member 60 has a first surface 610 and a second surface 620, which are parallel to each other. A reflecting first diffraction grating 611 serving as a first spatial wavelength branch means is formed on first surface 610 of transparent member 60. A reflecting second diffraction grating 621 serving as a second spatial wavelength branch means is formed on second surface 620 of transparent member 60. First surface 610 and second surface 620 are parallel to the y-z plane. First diffraction grating 611 and second diffraction grating 621 have grating directions parallel to the z-axis, identical grating periods, and identical structures. Each of first diffraction grating 611 and second diffraction grating 621 has a reflection coating of a metal such as aluminum or gold.

An optical input window 622 and an optical output window 623 are formed in a region where second diffraction grating 621 is not formed on second surface 620 of transparent member 60. Optical input window 622 and optical output window 623 have flat surfaces. In this embodiment, therefore, optical fiber collimators 80 and 81 each having a collimator function are used. The optical axes of optical fiber collimators 80 and 81 projected onto the x-y plane coincide with each other.

A window which outputs from the transparent member light components of the respective wavelengths, which are output from second diffraction grating 621 and reach first surface 610, is formed in a region where first diffraction grating 611 is not formed on first surface 610 of transparent member 60. Rectangular prisms 631 to 634 serving as optical path returning means are arranged on the optical paths of the light components of the respective wavelengths outside the transparent member. Rectangular prism 631 deflects the optical path of a light component having a wavelength $\lambda_1$. Rectangular prism 632 deflects the optical path of a light component having a wavelength $\lambda_2$. Rectangular prism 633 deflects the optical path of a light component having a wavelength $\lambda_3$. Rectangular prism 634 deflects the optical path of a light component having a wavelength $\lambda_4$. Each of Rectangular prisms 631 to 634 can move in a direction parallel to the optical path.

Optical signal processor 6 operates in the following way. Light collimated and output from the distal end of optical fiber collimator 80 is input to optical input window 622 of second surface 620 of transparent member 60. The light propagates through transparent member 60 from optical input window 622 to first surface 610 of transparent member 60. First diffraction grating 611 is formed in the region that includes the position at which the light is input from optical input window 622 to first surface 610. The light input to first diffraction grating 611 is diffracted by first diffraction grating 611 at diffraction angles corresponding to wavelengths and thus wavelength-branched. After that, the light propagates through transparent member 60 toward second surface 620 of transparent member 60. Second diffraction grating 621 is formed in the region that includes the positions at which the branched light components of the respective wavelengths are input to second surface 620.

The light components of the respective wavelengths, which are input to second diffraction grating 621, are diffracted by second diffraction grating 621, propagate through transparent member 60 in parallel toward first surface 610 of transparent member 60, and are output from first surface 610. The optical path of the light component having wavelength $\lambda_1$, which is output from first surface 610, is deflected by rectangular prism 631. The optical path of the light component having wavelength $\lambda_2$, which is output from first surface 610, is deflected by rectangular prism 632. The optical path of the light component having wavelength $\lambda_3$, which is output from first surface 610, is deflected by rectangular prism 633. The optical path of the light component having wavelength $\lambda_4$, which is output from first surface 610, is deflected by rectangular prism 634.

The light components having wavelengths $\lambda_1$ to $\lambda_4$, whose optical paths are deflected by rectangular prisms 631 to 634, travel through the returning path which is reverse to the forwarding path when projected to the x-y plane, enter the transparent member 60 through first surface 610, are multiplexed through second diffraction grating 621 and first diffraction grating 611, and output from optical output window 623 of second surface 620. The multiplexed light is input to the distal end of optical fiber collimator 81, focused, and propagates through the optical fiber.

In this way, optical signal processor 6 wavelength-branches the light output from the distal end of optical fiber collimator 80 through first diffraction grating 611 and second diffraction grating 621 of transparent member 60. Each of rectangular prisms 631 to 634 arranged outside transparent member 60 makes a corresponding one of the light components of the respective wavelengths pass through forwarding path and returning path which are different in the z-axis direction. The light components of the respective wavelengths are output to optical fiber collimator 81 through second diffraction grating 621 and first diffraction grating 611. The group delay of each of the light components having wavelengths $\lambda_1$ to $\lambda_4$, which is output from optical fiber collimator 80 and reaches optical fiber collimator 81, corresponds to the optical path deflecting position of each of rectangular prisms 631 to 634. In addition, since the position of each of rectangular prisms 631 to 634 can be changed, group delay of each of the light components having wavelengths $\lambda_1$ to $\lambda_4$, which is output from optical fiber collimator 80 and reaches optical fiber collimator 81, is also variable. As described above, optical signal processor 6 can operate as a dispersion adjusting device with a variable dispersion adjusting amount. Optical signal processor 6 has the same effect as that of optical signal processor 5 according to the fifth embodiment.

Figure 19:
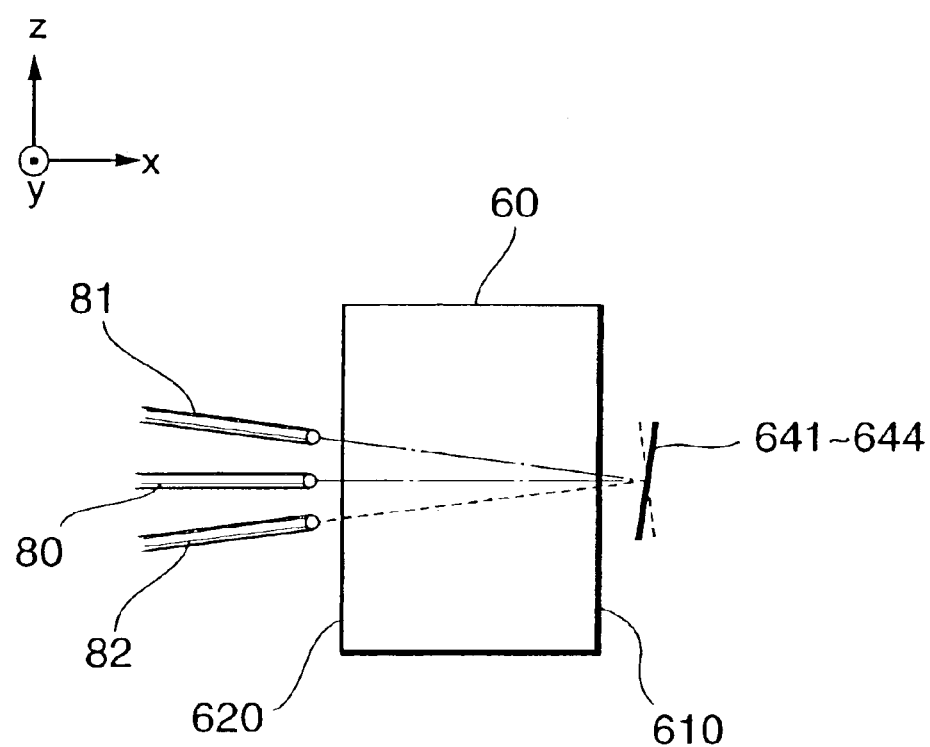
FIG. 19 is a side view of a modification of optical signal processor 6 according to the sixth embodiment.

In this embodiment, reflecting mirrors with variable tilt angles may be arranged as optical path returning means outside transparent member 60 in place of rectangular prisms 631 to 634. FIG. 19 is a side view of a modification of optical signal processor 6 according to the sixth embodiment. The optical signal processor of this modification has an optical fiber collimator 82 in addition to optical fiber collimators 80 and 81. Reflecting mirrors 641 to 644 having variable tilt angles are arranged outside transparent member 60. Of light components output from the distal end of optical fiber collimator 80, a light component in a certain wavelength range can be output to optical fiber collimator 81, and a light component in another wavelength range can be output to optical fiber collimator 82 in accordance with the tilt angle of each of reflecting mirrors 641 to 644. In addition, a light component in a certain wavelength range, which is output from the distal end of optical fiber collimator 81, and a light component in another wavelength range, which is output from the distal end of optical fiber collimator 82, can be multiplexed, and the multiplexed light can be output to optical fiber collimator 80. The optical signal processor of this modification can operate as an optical demultiplexer or an optical multiplexer. When each of reflecting mirrors 641 to 644 can move in a direction parallel to the optical path, the chromatic dispersion adjusting amount can be changed.

In this embodiment, in place of transparent member 60 having reflecting diffraction gratings, a transparent member having transparent diffraction gratings may be used. In the latter case, light output from optical fiber collimator 80 is diffracted by a transparent first diffraction grating formed on the first surface of the transparent member, propagates through the transparent member, is diffracted by a transparent second diffraction grating formed on the second surface, and output from the transparent member. The optical path of the light is deflected by a reflecting mirror or a rectangular prism serving as an optical path returning means. The light components are multiplexed sequentially through the second and first diffraction gratings of the transparent member and output to optical fiber collimator 81. In this case as well, the optical signal processor can operate as a dispersion adjusting device.

What is claimed is:

1. An optical signal processor, comprising:
    a transparent member, which has a first surface and a second surface parallel to said first surface, first planar spatial wavelength branch means, which reflects incoming light or makes the incoming light pass therethrough branching it into a plurality of light components by causing it to be output therefrom at different angles depending on the wavelengths, and is formed on said first surface, and
    second planar spatial wavelength branch means, which outputs the branched light components in parallel to each other and is formed on said second surface.

2. The optical signal processor according to claim 1, wherein said transparent member comprises silica glass.

3. The optical signal processor according to claim 1, wherein said transparent member comprises plastic.

4. The optical signal processor according to claim 1, wherein each of said first and second spatial wavelength branch means includes a diffraction grating.

5. The optical signal processor according to claim 4, wherein grating directions of the diffraction gratings of said first and second spatial wavelength branch means are parallel to each other.

6. The optical signal processor according to claim 5, wherein the diffraction gratings of said first and second spatial wavelength branch means have identical grating structures.

7. The optical signal processor according to claim 1, wherein said first and second spatial wavelength branch means are transparent type, said first spatial wavelength branch means branches the externally input light into light components of different wavelengths and causes the branched light to propagate through said transparent member, and
    said second spatial wavelength branch means outputs the branched light components having propagated through said transparent member from said transparent member.

8. The optical signal processor according to claim 1, wherein
    said first and second spatial wavelength branch means are reflecting type,
    said transparent member has an optical input window and an optical output window on surfaces of said transparent member,
    said optical input window propagates the externally input light into the transparent member,
    said first spatial wavelength branch means branches the light input from said optical input window into light components of different wavelengths and causes the branched light to propagate through said transparent member, and
    said second spatial wavelength branch means causes the branched light input from said optical input window to propagate through said transparent member making the branched light parallel to each other and outputs the branched light made parallel from said transparent member through said optical output window.

9. The optical signal processor according to claim 8, wherein said optical input window is formed in said second surface, and said optical output window is formed in said first surface.

10. The optical signal processor according to claim 8, a reflection coating is formed in each of regions where said first and second spatial wavelength branch means are formed.

11. The optical signal processor according to claim 10, wherein said reflection coating comprises aluminum.

12. The optical signal processor according to claim 10, wherein said reflection coating comprises gold.

13. The optical signal processor according to claim 8, wherein a lens is formed on at least one of said optical input window and said optical output window.

14. The optical signal processor according to claim 8, wherein
    a lens is formed on said optical input window,
    said first spatial wavelength branch means comprises a diffraction grating formed in a region that includes an intersection between said first surface and an optical axis of said lens, and
    said second spatial wavelength branch means is formed in a region that includes points on said second surface, which are separated from said intersection by $\Delta t \cdot \tan \beta_n$ in a direction parallel to said second surface (for $\lambda_n = N \Lambda(\sin \beta_0 + \sin \beta_n)$, where m is a diffraction order, $\beta_n$ is a wavelength in a use wavelength range, N is a refractive index of said transparent member, $\Lambda$ is a grating spacing of said diffraction grating, $\beta_0$ is an angle made by a normal to said first surface and the optical axis of said lens, and Δt is a distance between said first surface and said second surface).

15. The optical signal processor according to claim 1, further comprising optical path returning means for returning an optical path of a light component having a wavelength, which is output from said second spatial wavelength branch means, to said second spatial wavelength branch means.

16. The optical signal processor according to claim 15, wherein said optical path returning means includes a reflecting mirror.

17. The optical signal processor according to claim 15, wherein said optical path returning means includes a rectangular prism.

18. The optical signal processor according to claim 15, wherein said optical path returning means is arranged for each of optical paths of the light components of the respective wavelengths, which are output from said second spatial wavelength branch means, and a distance between a diffraction position of a light component having a specific wavelength on said second spatial wavelength branch means and said optical path returning means corresponding to this light component is different from a distance between a diffraction position of a light component having another wavelength on said second spatial wavelength branch means and said optical path returning means corresponding to this light component.

19. The optical signal processor according to claim 15, wherein said optical path returning means is formed on a surface of said transparent member.

20. The optical signal processor according to claim 15, wherein said optical path returning means is arranged outside the transparent member.

21. The optical signal processor according to claim 20, wherein said optical path returning means is arranged for each of optical paths of the light components of the respective wavelengths, which are output from said second spatial wavelength branch means, and a position at which said optical path returning means corresponding to each wavelength is arranged can be changed in a direction of optical path.

* * * * *